Oct. 23, 1928.  
W. T. B. ROBERTS  
1,688,436  
FASTENING INSERTING MACHINE  
Filed Nov. 13, 1922 4 Sheets-Sheet 1

INVENTOR—
William T. B. Roberts
By his Attorney,
Nelson W. Howard

Oct. 23, 1928.

W. T. B. ROBERTS 1,688,436

FASTENING INSERTING MACHINE

Filed Nov. 13, 1922 4 Sheets-Sheet 2

INVENTOR-
William T. B. Roberts
By his Attorney
Nelson W. Howard

Oct. 23, 1928.

W. T. B. ROBERTS 1,688,436

FASTENING INSERTING MACHINE

Filed Nov. 13, 1922 4 Sheets-Sheet 4

Patented Oct. 23, 1928.

1,688,436

UNITED STATES PATENT OFFICE.

WILLIAM THOMAS BUCKINGHAM ROBERTS, OF LEICESTER, ENGLAND, ASSIGNOR TO UNITED SHOE MACHINERY CORPORATION, OF PATERSON, NEW JERSEY, A CORPORATION OF NEW JERSEY.

FASTENING-INSERTING MACHINE.

Application filed November 13, 1922, Serial No. 600,497, and in Great Britain December 5, 1921.

This invention relates to fastening-inserting and similar machines, and is illustrated as embodied in a machine adapted for use by shoe repairers.

Machines intended for use in repairing shoes should be arranged for quick adjustment to supply different sizes or kinds of fastenings, since successive pieces of work very often differ in thickness and in other characteristics, and for the same reason the work-engaging parts should be constructed and arranged to operate in a uniform manner on different kinds of work. It is convenient that such a machine should be capable of arrangement for operation either by mechanical or by manual power, and that a minimum of exertion should be required when it is arranged for manual operation. An object of the present invention is to provide a compact and efficient machine meeting these requirements.

Quick adjustment to set the machine to use any one of several sizes or kinds of fastenings is secured in the illustrated machine by a novel arrangement by which a single fastening-inserting means may be supplied from any one of a row or series of hoppers (or other supply receptacles), as for example by mounting the hoppers to be moved bodily as a unit. This forms the subject-matter of my co-pending application Serial No. 255,169, filed February 17, 1928, as a division of the present application and, accordingly, is not claimed herein.

The illustrated improved fastening-inserting means, in order to maintain a high speed of operation and in accordance with a feature of the invention, includes a device which is vertically movable to engage and hold work positioned on the work support of the machine, and which is moved to relieve the pressure on the work and permit the work to be fed after the insertion of each fastening, together with means for limiting the movement of the device away from the work to a distance just sufficient to permit such feeding of the work. To facilitate the removal of a finished shoe or other piece of work and the insertion of a succeeding shoe, the limiting means is arranged to be rendered inoperative at the will of the operator.

To secure the desired uniformity of operation on different kinds of work, the invention further contemplates that the above-described limiting means shall operate differently on parts of the work which differ in thickness, as for example by being reset after the insertion of each fastening, so that no matter how the work may vary, the movement of the device away from the work on the work support will be uniform and of predetermined extent. In the form shown in the drawings, movement of an operating plunger is limited by a pawl and ratchet which are disengaged and reset each time a fastening is inserted.

There is also illustrated novel power mechanism which may be provided for uniformly operating the fastening-inserting means, and also an improved work-feeding device which may be used if desired. The novel features of the above and other parts and combinations of parts are explained in the following description of the embodiment of the invention illustrated in the accompanying drawings, in which.

Figure 1:
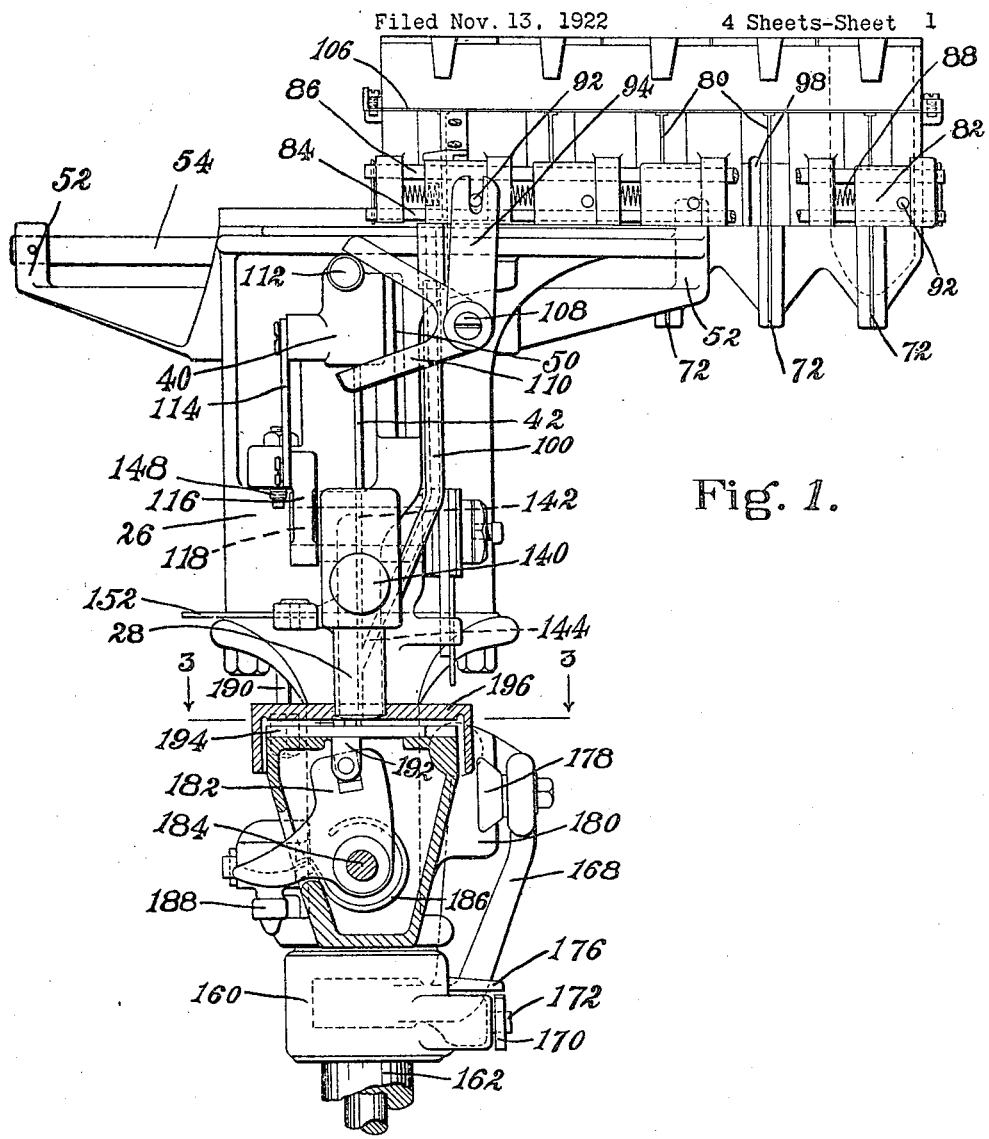
Figure 1 is a view partly in front elevation and partly in section on the line 1—1 of Figure 2, showing the head of the machine.

The machine shown in the drawings comprises a work support or horn 20 rotatably mounted on a vertical post 22 fixed in the base or pedestal 24. A head 26, which supports various parts of the operating mechanism, is vertically movable to bring a nail throat or nozzle 28 carried by the head into engagement with the upper surface of the work on work support 20. Thus the nail throat 28 serves both as a work holding member and as a fastening positioning device in co-operation with the vertically stationary work support 20.

The head 26 is guided in its vertical movement by a vertical shaft 30 which extends through a bearing 32 in head 26 and in the base 24. The head is also guided by a vertical rod 34 situated behind the shaft 30, which is fixed in a bracket 36 forming the upper part of the head, and which passes through a lug 38 at the bottom of the head and through a bearing in the column or base of the machine.

A member 40 carrying a nail driver 42 is fixed to the upper end of vertical shaft 30 and has a rearwardly extending lug 44 through which passes vertical rod 34. A spring 46 surrounding rod 34 and bearing against the lower face of lug 44 on driver carrier 40 and against the upper face of lug 38 at the bottom of head 26, urges member 40 upwardly until the upper face of lug 44 encounters the lower face of a projecting portion 48 of the bracket 36 in which rod 34 is fixed. A yielding connection is thus created between the member 40 and head 26. A vertically disposed plate 50 on the front of member 40 slides in a vertical groove in head 26 to guide member 40 in its vertical movement.

At the rear of bracket 36 and above the vertical rod 34 are upstanding lugs 52 in which is fixed a horizontal shaft 54 extending transversely across the machine. Slidingly and tiltably mounted on this shaft is a unit consisting of a series of nail hoppers 56 which, toward the front of the machine, is provided with a horizontal member 58 resting on a corresponding horizontal member 60 formed on the bracket 36. This unit provides a number of supply receptacles (in this instance 5) in each of which may be placed nails of the same character but different in character from those placed in the other receptacles. Each of these supply receptacles is closed at the top by a lid 62 hinged at the rear on a horizontal rod 64 and shaped at the front to provide a spring latch 66 engaging a groove formed on the upper front walls. The bottoms of the receptacles are curved from the rear downwardly, and forwardly are inclined rectilinearly as at 68, at an angle of substantially 40 degrees to the horizontal plane, to the front vertical walls 70. The upwardly and forwardly inclined portions 68 have vertically disposed passages 72 to form raceways in which the nails are suspended by their heads in the usual manner. The raceways are covered by plates 74 fixed in receptacles 56 to hold up the mass of nails while leaving room beneath the plates 74 for the passage of the heads of the nails along each raceway. Plates 74 have openings 76 at their rear ends to allow the nails to fall on to the raceways 72. From the top of the inclines 68, each of the raceways extends horizontally for a short distance (as at 78) forwardly of the front wall 70 of the corresponding receptacle 56, and is then downwardly inclined, as at 80, at an angle of approximately 45 degrees.

Figure 4:
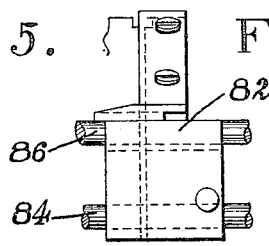
Figs. 4, 5 and 6 are respectively a top plan view, a front elevation and a side elevation showing one of the fastening feeding devices.
Figures 5, 6:
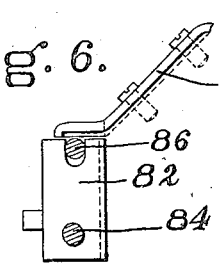

Opposite the end of each of the above described raceways is a separator comprising a rectangular block 82 slidingly mounted on a horizontal rod 84 extending across the front of and below the ends of raceways 72 and carried in extensions from the raceways. Blocks 82 are slotted downwardly from their top faces to embrace a second and parallel rod 86 supported in the extensions above rod 84. By partly withdrawing rod 84 any of the blocks 82 may readily be removed by reason of its slotted connection with rod 86 which acts as a guide for the blocks. Each of the blocks 82 is urged to the right (Fig. 1) into engagement with one of the extensions from raceways by a light spring 88 interposed between the block and the corresponding extension, and when the blocks are in this position a vertical groove 90 (Fig. 4) formed in the rear face of each block is positioned in alignment with one of the end portions 80 of a raceway 72 so as to receive the endmost nail in the raceway.

Figure 2:
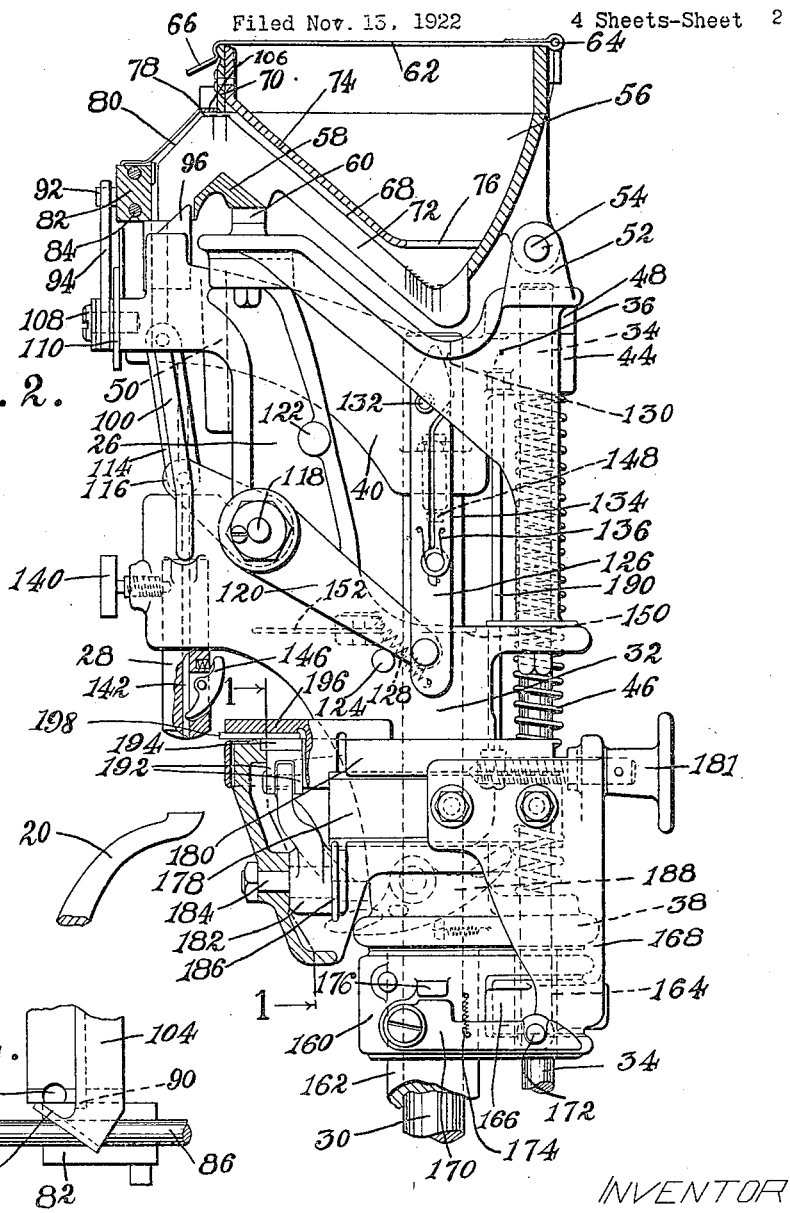
Fig. 2 is a view partly in side elevation and partly in section, also showing the head of the machine.

Extending forwardly from the front face of each block is a projection such as a stud 92 adapted to engage the slotted upper end of a separator arm 94 pivoted on head 26. When it is desired to insert nails of a different character from those previously inserted, the unit of hoppers or receptacles 56 is tilted upwardly about the horizontal rod 54 on which it is mounted, thereby raising the stud 92 on that separator block 82 which has previously been in operative position out of the slot in separator arm 94. The unit of hoppers is then slid along rod 54 to bring the stud 92 of another separator 82 into position over the slotted arm. The hoppers are then lowered to position the stud in engagement with arm 94 to operate the corresponding separator to furnish nails of a different character. The selected hopper is maintained in alinement with the rest of the fastening inserting mechanism by a plate 96 (Fig. 2) fixed on head 26 which enters the raceway slit from the under side of the front end 80 of the raceway.

When the separator is moved to the left against the resistance of its spring 88, the groove 90 in its rear face is moved into alinement with a vertical groove 98 (Figs. 1 and 4) formed in the front face of a chute or continuing raceway which communicates with a nail delivery raceway or tube 100 arranged to communicate in turn with the nail throat 28. The nail in the groove 90 in the separator is discharged into the groove 98 in the vertical continuing raceway by a cam surface 102 (Fig. 4) formed on a depending end portion of a plate 104 which extends upwardly and rearwardly to act as a cover for the exposed portion 80 of the raceway slit. A strip 106 covers the exposed portions 78 of the raceways, this strip being provided with slots so that by moving the strip lengthwise the slots may be moved into alinement with the raceways and a wire or other implement inserted to remove a bent or misformed nail.

The separator arm 94 is pivoted on a horizontal stud 108 fixed in head 26, and also mounted on this stud and frictionally connected with the separator arm is a forked arm 110. Within the fork of the latter arm is positioned a stud 112 (Fig. 1) carried by the above described nail driving member 40, which in its downward and upward movements, oscillates separator arm 94 through engagement with the forked arm to actuate the separator.

The driver carrier 40 is connected by a link 114 with an arm 116 carried by a rock shaft 118 mounted in a bearing in head 26 and extending across the machine. Frictionally connected to the opposite end of this shaft is a rearwardly extending arm 120 which is limited in its movement by stops 122 and 124 formed on the head above and below the arm. Arm 120 is pivotally connected at its rear end to the lower end of an upwardly extending bar or finger 126, the upper end of which is arranged to enter and pass along the upwardly and forwardly inclined portion of that raceway slit 72 which is in operative position to push the nails in the slit forwardly toward the separator. A spring 128 is connected at one end to arm 120 and at the other end to bar 126 below its point of pivotal connection and urges the upper end of bar rearwardly against a guide surface 130 formed on the bracket 36. The bar 126 has near its upper end a laterally extending pin 132 which, when the bar is moved upwards during the descent of driving member 40, engages the under side of the upwardly and forwardly inclined portion of raceway 72, and causes the upper end of bar 126 to pass along the slit. The bar 126 has pivotally connected to it, above its pivotal connection to arm 120, a finger 134 which is urged rearwardly against the guide surface 130 by a spring 136. Thus as bar 126 is moved upwardly the upper end of finger 134 enters the opening 76 and passes up into the nail hopper 56 to disturb the mass of nails in the receptacle and cause some of them to fall through the opening on to the raceway. The bar 126 is recessed to receive finger 134.

The nail throat 28 is fixed in the head 26 by a clamp screw 140, and has a central driver passage 142 and an upwardly inclined nail passage 144 connecting with the driver passage and with the nail delivery tube 100 described above. At the lower end of the throat there is pivoted a finger 146 which is spring pressed into the driver passage to prevent a nail delivered to the throat from falling out of the driver passage. The extent of the downward movement of the nail driving member 40 is determined by an adjustable screw shown at 148 in Figures 1 and 2, and which is arranged to engage a face 150 on head 26. A thin plate 152 is pivoted on head 26 and may be swung into position over the face 150 into the path of screw 148. The arrangement is such that when the plate 152 is swung beneath screw 148, the heads of the nails will be driven flush with the surface of the work, but if the plate is swung back from under screw 148 the nails will be driven slightly below the surface of the work.

In the operation of the mechanism thus far described, the nail driving member 40 descends and carries with it the head 26 until the nail throat 28 engages the upper surface of the work positioned on the work support 20. The member 40 then continues to descend against the resistance of spring 46 and raises the vertical bar 126 which enters the raceway slit 72 and pushes the nails along the raceway while, at the same time, finger 134 on the bar enters the opening 76 and, moving upwardly, agitates the mass of nails in the receptacle. As the member 40 nears the end of its driving stroke, stud 112 carried thereby engages the lower arm of the forked arm 110 connected to the separator arm 94 and rocks the separator arm to move one of the separator blocks 82 from nail receiving position to nail delivering position. A nail is thus delivered to the throat 28 when the driver 42 is at the lower limit of its driving stroke, and rests against the side of the driver until the driver is raised, when the nail passes into the driver passage 142 where it is retained by a finger 146. When the nail driving member 40 is raised the separator block 82 is returned by engagement of stud 112 with the upper arm of forked arm 110.

Novel mechanism is provided for acting upon the edge of the work to feed it past the nail throat. While it is sometimes desirable to feed the work automatically, for example when inserting nails along the edge of a shoe sole, it is also sometimes desirable to feed the work by hand, for example when inserting nails across the sole of the shoe, as in attaching a half sole. For this reason the work feeding mechanism hereinafter described is adapted to be swung into inoperative position at one side of the machine. When the work feeding mechanism is swung to inoperative position an adjustable edge gage may be fixed to the head.

In the form of work feeding mechanism shown in the drawings, a clamping member 160 is fixed on the upper end of a vertical sleeve 162, on which head 26 is fixedly mounted, and which loosely surrounds the above described vertical shaft 30. Member 160 is bored at its rear end to receive a sleeve 164 through which passes the vertical rod 34. Member 160 is formed at its rear side with a forked portion in which is positioned a lug 166 formed on an upwardly projecting bracket 168 in such a manner as to permit the bracket to swing about the sleeve 164. A latch 170 pivoted on the clamping member 160 is arranged to engage a pin 172 projecting from bracket 168 to hold the bracket in operative position. A spring 174 holds the latch in its operative position, and a lug 176 limits upward movement of the latch when bracket 168 is swung back.

Bracket 168 carries a plate 178, the edges of which are beveled to engage a dovetailed guideway formed in a casing 180 which supports the feeding mechanism. An adjusting screw 181 is mounted in a lug formed on bracket 168 to adjust the casing 180 forward and backward in the machine. In the forward part of the casing a bell crank lever 182 is mounted on a short horizontal shaft 184 to be rocked in one direction by a coiled spring 186 and in the opposite direction by engagement with one arm of a lever 188 pivoted on the left hand side (Fig. 1) of head 26. The opposite end of lever 188 extends rearwardly into the path of a vertical rod 190 fixed in the above described nail driving member 40. As the nail driving member moves downwardly in the operation of the machine, rod 190 rocks lever 188, which in turn rocks the bell crank lever 182 against the resistance of spring 186.

Figure 3:
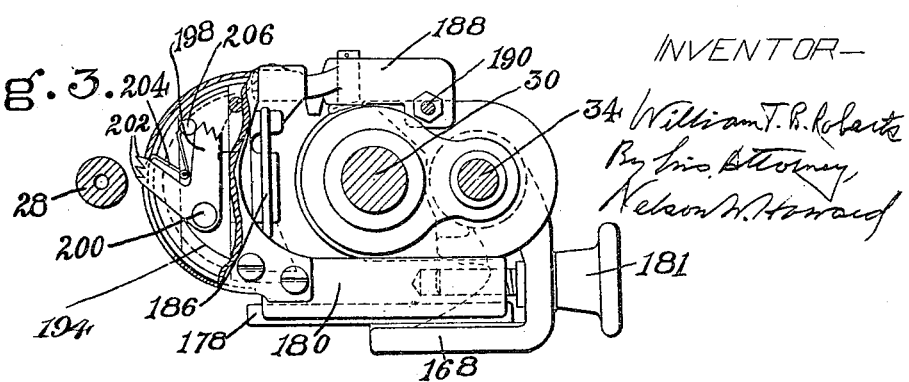
Fig. 3 is a section on the line 3—3 of Figure 1, showing the work feeding mechanism.

The bell crank lever 182 has a vertically disposed arm which is forked at its upper end to embrace a block pivoted between lugs 192 carried by a feed slide 194. This feed slide is mounted to reciprocate across the machine in a guideway formed in casing 180 and is retained in the casing by a cover plate 196. A feed pawl 198 (Fig. 3) is pivotally mounted at 200 on the feed slide 194. This feed pawl has an arm projecting through a slot in casing 180 and which is formed with a horizontal row of beveled teeth 202 adapted to engage and feed the edge of the work. A second arm of the feed pawl has similar teeth formed on it so that by reversing the pawl the second set of teeth may be brought into operation when the first set becomes worn out. This pawl is urged about the pivot toward the work by a spring 204 which engages one arm of the pawl and a stop pin 206. The pin 206 also acts as a stop to engage the second arm of the pawl to limit the extent of movement imparted by spring 204. Teeth 202 are shaped to dig into the work during the feeding stroke and to slide over the work during the return stroke.

Figure 7:
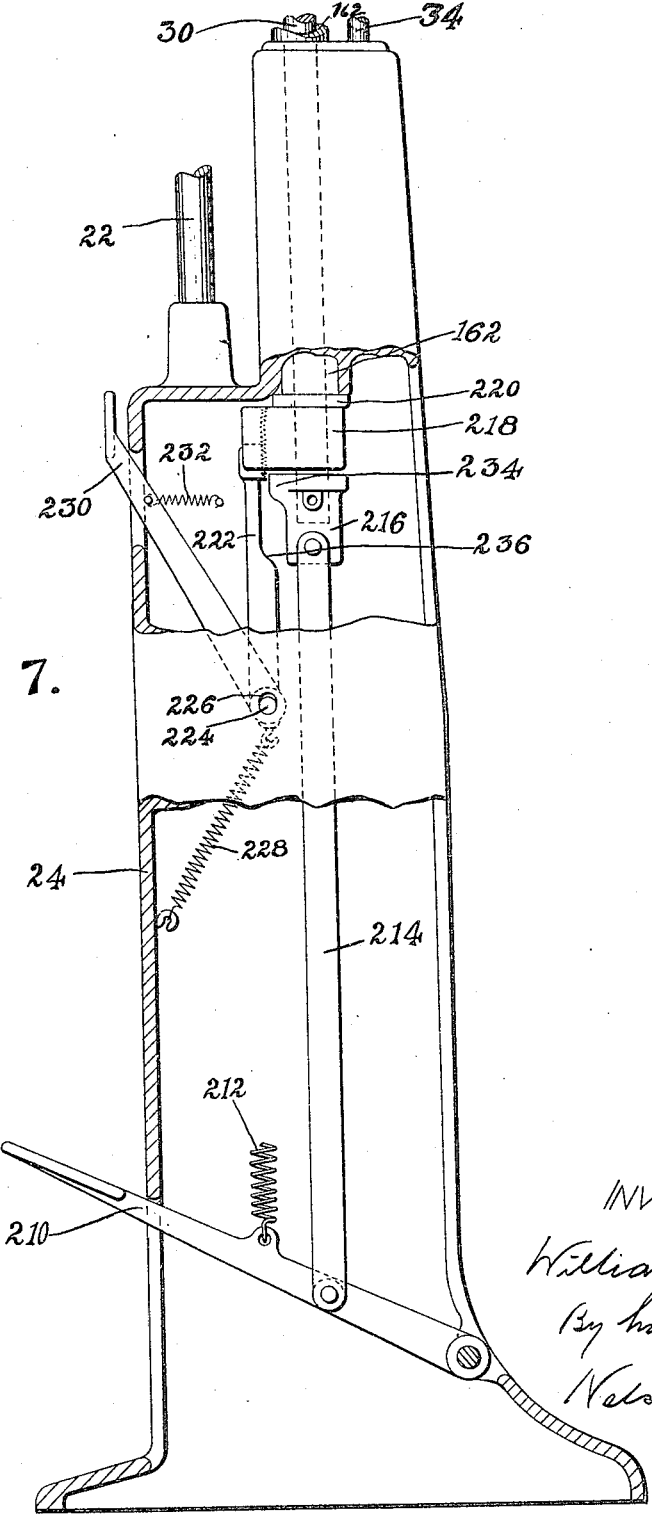
Fig. 7 is a side elevation of the base of the machine with the side wall partly broken away to show the arrangement for operating the machine by foot power.

One form of mechanism by which the above described fastening inserting means may be operated is illustrated in Figure 7. A treadle 210 is pivoted at the rear of the base 24 and projects forwardly into a convenient position for depression by the operator. A spring 212 normally maintains the treadle in raised position. The above described vertical shaft 30 is connected to the treadle by a link 214 which is pivoted at its upper end to a cam collar 216 secured to the lower end of shaft 30. As above described, the shaft 30 is connected to the nail driving member 40. Surrounding shaft 30 below head 26 and supported in upper and lower bearings in base 24 is the sleeve 162 which has been described as secured to the head 26 in such a manner as to carry the head. The lower end of sleeve 162 is formed with an enlarged portion 218 arranged to be engaged by the top of collar 216 to raise the head 26 when the treadle is released. This enlarged portion engages a resilient washer 220 which acts as a stop to determine its upper position.

The enlarged portion 218 of sleeve 162 is formed on its front face with ratchet teeth constructed and arranged to be engaged by ratchet teeth formed on a vertically disposed pawl or arm 222 pivotally mounted on a horizontal shaft 224 mounted in vertical slots 226 formed in opposite sides of the base 24. These slots are shown as being substantially $\frac{1}{8}''$ longer than the diameter of shaft 224, and the shaft is normally held at the bottom of the slots, and is urged in a clockwise direction (as viewed in Fig. 7) by a spring 228 connected to base 24 and to the hub of arm 222. Projecting forwardly from arm 222 is a second arm 230 passing through an opening in the front of base 24 and formed with a hand piece by which it may be turned about shaft 224 against the resistance of a spring 232 to disengage the above described ratchet teeth.

When treadle 210 is depressed, shaft 30 moves the driving member 40 and head 26 downwardly together, while the ratchet teeth on the enlarged portion 218 click past the ratchet teeth on arm 222. The member 40, head 26 and sleeve 162 continue to descend together until the nail throat 28 on head 26 engages the work on the work support 20, after which downward movement of head 26 and sleeve 162 is arrested and the sleeve and head are locked against upward movement by the ratchet teeth. The nail driving member 40 continues to descend against the resistance of spring 46 to drive the nail.

When the treadle is released, spring 212 raises the nail driving member 40, and when the above described lug 44 on member 40 engages the bottom face of lug 48 formed on bracket 36, head 26 and arms 222 and 230 are also raised until shaft 224 engages the upper ends of slots 226. If the work should be thinner when the next fastening is inserted, head 26 and sleeve 162 will be moved downwardly to a correspondingly lower position, the ratchet teeth on the enlarged portion 218 of sleeve 162 clicking past the teeth on arm 222 after shaft 224 has engaged the bottoms of slots 226. When the treadle is again released, head 26 will be raised as described above a distance corresponding to the length of slots 226. If, however, the work should increase in thickness the nail throat would meet the work sooner and the head would, therefore, not be lowered as far as before. Unless the ratchet were re-set to this new position of the head, when the treadle was again released, it would only be raised to the same position as formerly, and the gap between the nail throat and the work would be smaller than before. If the work were to gradually increase in thickness it would thus eventually become impossible to feed the work.

To reset the ratchet according to each position of the head, and thus maintain approximately constant the gap between the throat and the work, the ratchet is unlocked each time a fastening is inserted by a projection 234 on collar 216 toward the end of the nail driving stroke after head 26 has been arrested. This projection engages a cam 236 formed on arm 222 and turns this arm about its pivot in a counterclockwise direction (as viewed in Fig. 7) to unlock the ratchet teeth. Arm 222 is then lowered by its spring 228 until shaft 224 engages the bottoms of slots 226. When collar 216 ascends, and long before head 26 is allowed to rise, the ratchet teeth on the pawl or arm 222 again engage the ratchet teeth on the enlarged portion 218 of sleeve 162.

When it is desired to raise the head to its highest position for the removal of a finished shoe, or for the insertion of another shoe, arm 230 is rocked manually to release the ratchet teeth so that head 26 and nail driving member 40 are raised by spring 212 until the enlarged member 218 engages the resilient washer 220.

Figure 8:
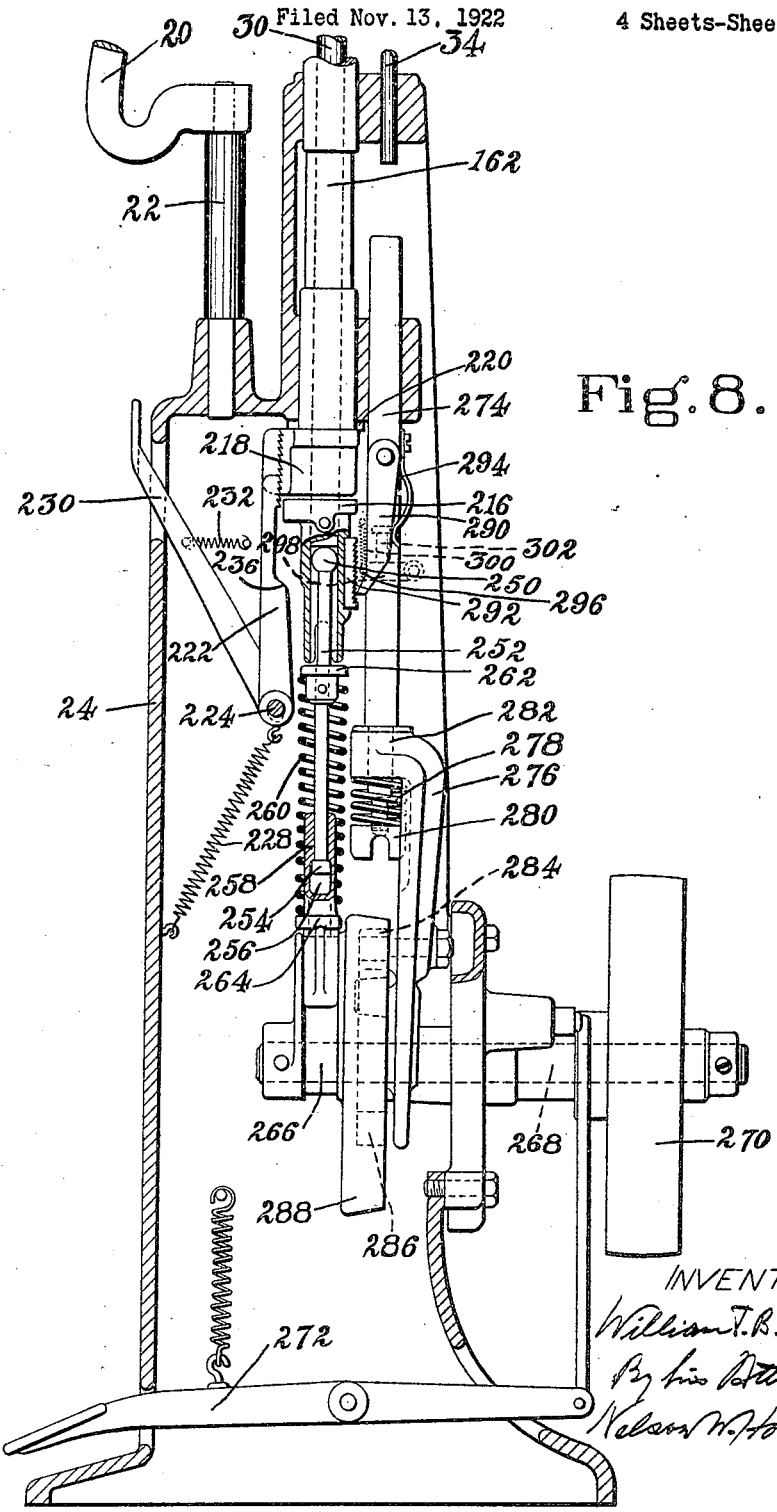
Fig. 8 is a view corresponding to Figure 7 but showing the machine arranged for operation by mechanical power.

An improved form of power operated mechanism which may be substituted for the above described connections is illustrated in Figure 8. In this form of mechanism the above described collar 216, which is fixed on the lower end of the vertical shaft 30, is extended downwardly and is bored to form a vertical recess to receive a ball 250 fixed on the upper end of a rod 252. This rod at is lower end is formed with a head 254 seated in a recess 256 in a shoe 258. A spring 260 surrounds rod 252 and is held under compression between a collar 262 fixed on the rod 252 and a flange 264 formed on shoe 258. This shoe rests on an eccentric 266 mounted on a horizontal shaft 268 journaled in the base 24. This shaft carries a driving pulley 270 which may be connected to the shaft by a suitable clutch controlled by a treadle 272.

Parallel to and just behind the vertical shaft 30 is a nail driving rod 274 which, at its upper end, slides in a bearing in the base 24 and at its lower end is slidingly connected to a yoke 276 which straddles and is guided by one bearing of the driving shaft 268. A compression spring 278 surrounds the lower end of the nail driving rod 274 and is confined between a nut 280 on the lower end of the rod and a lug 282 on the yoke 276. The yoke carries a cam roll 284 engaging a face cam groove 286 in a cam member 288 mounted on shaft 268.

The nail driving rod 274 carries a pivotally mounted pawl 290 arranged to engage one or another of a series of ratchet teeth 292 secured on the rear side of collar 216. This pawl is urged by a leaf spring 294 against a stop pin 296 mounted on an arm 298 pivoted on the base 24. In order to permit adjustment of the position of the stop pin 296, arm 298 is urged by a spring 300 against an adjusting screw 302 mounted in a lug on the base 24. By adjusting screw 302, the position of pin 296 relatively to pawl 290 is changed. Screw 302 will ordinarily be adjusted so that the pawl is just clear of the teeth of ratchet 292 when the pawl is in its highest position.

When the drive shaft 268 rotates to operate the eccentric 266 and the cam 288, head 26 is first lowered until the nail throat 28 engages the work. During this time the cam roll 284 is in a concentric part of cam groove 286 and no movement of pawl 290 takes place. During continued rotation of the shaft the ball 250 on the upper end of rod 252 slides down in the recess in collar 216, and cam 288 acts on the roll 284 to move pawl 290 and nail driving rod 274 downwardly. The pawl is immediately allowed by pin 296 to engage one of the teeth on ratchet member 292 to depress collar 216 and effect the insertion of the nail. During this operation the spring 278 on the lower end of the nail driving rod 274 may yield.

The head 26 and sleeve 162 are held in the position to which they are moved as described above, as in the treadle operated mechanism, and during continued rotation of the drive shaft pawl 290 is raised and withdrawn from the teeth of ratchet 292, while ball 250 on the upper end of rod 252 slides upwardly in its recess until it engages the lower end of rod 30, whereupon head 26 is raised until the shaft 224 meets the tops of slots 226. Thus, in order to facilitate the feeding of the work, after the insertion of each fastening the head 26 is moved upwardly a distance determined by the elongation of slot 226, measured from the position occupied by said head 26 during the insertion of the preceding fastening. During further rotation of the drive shaft the spring 260 surrounding the rod 252 will be compressed. If the sleeve 162 is unlocked by the hand lever 230, as described in connection with the treadle-operated mechanism, the spring 260 will raise the head to its highest position to facilitate removal of the work.

In operation, the unit of fastening supplying receptacles is moved across the machine to place any selected receptacle in position to supply fastenings. The work having been placed on the work support 20, and the feeding mechanism having been swung to operative or inoperative position according as the fastenings are to be inserted along the edge of or across the work, the machine is operated either by repeated depression of treadle 210 operating the connections shown in Figure 7 or by holding treadle 272 in its depressed position to allow repeated rotations of drive shaft 268 to operate the connections shown in Figure 8. In either case, head 26 will be lowered by member 40 until the nail throat 28 engages the work, and thereafter member 40 will descend relatively to head 26 to insert the first fastening. During the first part of the return movement of the vertical shaft 30 and before head 26 starts to rise, arm or pawl 222 is rocked by spring 232 to engage its teeth with the ratchet teeth carried by enlarged portion 218 of sleeve 162. During further movement of the vertical shaft 30, lug 44 engages the projecting portion 48 of bracket 36 carried by head 26, and the member 40 and the head 26 rise together until shaft 224 engages the upper ends of slots 226. Thereafter a series of fastenings is inserted, and as each fastening is inserted the arm or pawl 222 is reset as above described in such a manner that the upward movements of the head are always of a predetermined extent just sufficient to relieve the work for its feeding movement. When the last of the series of fastenings has been inserted, hand lever 230 is operated to disengage pawl or arm 222 from the ratchet teeth on the enlarged portion 218 of sleeve 162 and member 40 and head 26 are moved upwardly by spring 212 or spring 260, as the case may be, to their highest positions.

While my invention has been described as embodied in a fastening inserting machine which is well adapted for use in repairing shoes, it is not my intention to limit its scope by such description or otherwise than by the terms of the appended claims, as in many aspects it may be embodied in fastening inserting machines of other types, and some features are in use in machines other than fastening inserting machines.

Having described my invention, what I claim as new and desire to secure by Letters Patent of the United States is:—

1. A machine of the class described having, in combination, a vertically movable head, a work support, a throat member carried by the head for engaging work on the support and for positioning a fastening, means carried by the head to insert the fastening, and means for raising and lowering the head of the machine a relatively short distance between the insertion of successive fastenings and for raising it a relatively greater distance to facilitate the insertion and removal of the work.

2. A machine of the class described having, in combination, a work support, a vertically movable head including a throat for engaging work on the support and for positioning a fastening, a driver carried by the head, and mechanism for operating the driver to insert fastenings, said mechanism being constructed and arranged for raising and lowering said throat a relatively short distance between the insertion of successive fastenings and for raising it a relatively greater distance to facilitate the insertion and removal of the work.

3. A machine of the class described having, in combination, a vertically-movable head including a throat for positioning a fastening, means to insert fastenings positioned thereby, means to raise and lower the head, means to limit the vertical movement of the head between the insertion of successive fastenings, and auxiliary means for rendering the limiting means inoperative and permitting the head to rise a substantial distance to facilitate removing the work.

4. A machine of the class described having, in combination, a work support, a vertically-movable head including a device to hold the work against the support, means to insert a fastening into work held by said device, means to raise and lower the head, means to limit the upward work-relieving movement of the head after the insertion of each fastening, and auxiliary means to render the limiting means inoperative and to permit the head to rise to facilitate removing the work.

5. A machine of the class described having, in combination, a vertically-movable head including fastening-inserting means, means to raise and lower the head between the insertion of successive fastenings to facilitate feeding the work, a retaining member to limit the upward work-relieving movement of the head, and a controller to move said member to an inoperative position to permit the head to move vertically a substantial distance to facilitate removal of the work.

6. A machine of the class described having, in combination, a vertically-movable work-engaging member, means for inserting fastenings in work engaged thereby, means to move said member away from and toward the work to facilitate feeding the work between the insertion of successive fastenings, pawl and ratchet devices, one of which is connected to said member and the other of which is vertically movable, means for limiting the movement of the vertically-movable device to operate through the other device to permit said member a short range of movement and means for disengaging the pawl and ratchet devices to permit considerable separation of said member and the work to facilitate removing the work.

7. A machine of the class described having, in combination, a vertically-movable device for engaging work and positioning a fastening with respect thereto, a separately-movable device for inserting fastenings positioned thereby, a yielding connection between said devices, means for moving the devices together until the first device engages the work and for then operating the fastening-inserting device against the resistance of said connection and for then returning said devices to permit feeding movement of the work, means for limiting the returning of said devices to an extent sufficient to relieve the work, and auxiliary means for rendering the limiting means inoperative at will.

8. A fastening-inserting machine having, in combination, a vertically stationary work-support, a head comprising fastening-inserting means and a fastening-positioning device and a source of supply of fastenings, means to move the head toward and from work on the support, and auxiliary means automatically controlling such movement of the head in accordance with the thickness of the work so that the head moves a substantially constant distance measured from the surface of the work in spite of variations in the thickness of the work.

9. In a machine of the class described having, in combination, a work-support, a movable head comprising a work-engaging member and fastening-inserting means, means differently to move the head toward the work before the insertion of different fastenings to bring said member into engagement with parts of the work of different thicknesses and to operate the fastening-inserting means, and means for moving the head a uniform predetermined distance away from the work after the insertion of each of said different fastenings.

10. A machine of the class described having in combination, a work-support, a device to engage work thereon and position fastenings relatively to the work, means to insert the fastenings so positioned, means to move said device away from the work after the insertion of each fastening, and means differently to limit the movement of said device when operating on pieces of work of different thicknesses in such a manner that the device moves away from the work a predetermined distance after the insertion of each fastening, regardless of variations in the thickness of the work.

11. A machine of the class described having, in combination, a work-support, a work-holding and fastening-positioning device, means to insert fastenings positioned by said device, means to move the device toward the work-support into engagement with the work before the insertion of each fastening and after such insertion to move the device in the opposite direction to permit the work to be fed, means to limit the movement away from the work to a predetermined distance, and auxiliary means to reset the limiting means when each fastening is inserted to cause it to operate in a uniform manner on different thicknesses of the work.

12. A machine of the class described having, in combination, relatively-movable and yieldingly-connected work-engaging and fastening-inserting devices, mechanism for operating said devices simultaneously differently before the insertion of different fastenings to bring said work-engaging device against parts of the work of different thicknesses and for thereafter separately operating the fastening-inserting device, and a holding member to limit the movement of said devices away from the work to a uniform predetermined distance after the insertion of each of said different fastenings.

13. A machine of the class described having, in combination, relatively-movable and yieldingly-connected work-engaging and fastening-inserting devices, mechanism for operating said devices simultaneously differently before the insertion of different fastenings to bring said work-engaging device against parts of the work of different thicknesses and for thereafter separately operating the fastening-inserting device, a holding member to limit the movement of said devices away from the work to a uniform predetermined distance after the insertion of each of said different fastenings, and means operated by the separate operation of the fastening-inserting device to reset the holding member after the insertion of each fastening.

14. A machine of the class described having, in combination, relatively-movable and yieldingly-connected work-engaging and fastening-inserting devices, mechanism for operating said devices simultaneously differently before the insertion of different fastenings to bring said work-engaging device against parts of the work of different thicknesses and for thereafter separately operating the fastening inserting device, a holding member to limit the movement of said devices away from the work to a uniform predetermined distance after the insertion of each of said different fastenings, and a manually-operable controller to render the holding member inoperative at will to facilitate removal of the work.

15. A machine of the class described having, in combination, work-holding and fastening-inserting devices, operating mechanism therefor including a vertically-movable plunger, pawl and ratchet members, one of which is carried by the plunger and the other of which is vertically movable, and stops to limit the movement of the vertically-movable member, said members being constructed and arranged to engage in a manner to allow the plunger to be lowered and to hold the plunger in such a manner that its upward movement is limited by one of said stops.

16. A machine as defined in claim 15 having auxiliary means operated by the fastening-inserting device to disengage and reset said members each time a fastening is inserted.

17. A machine as defined in claim 15 having a manually-operable controller for disengaging said members at will.

18. A fastening-inserting machine having, in combination, work-holding and fastening-inserting devices, means to move said devices toward and from the work, means to limit their motion from the work to a predetermined distance to position them uniformly relatively to parts of the work of different thicknesses, and means to impart movements toward the work of predetermined extent for the fastening-inserting device and of such an extent for the work-holding device as to bring it into engagement with the work.

19. A fastening-inserting machine having, in combination, work-holding and fastening-inserting devices, a member to move said devices toward and from the work, means to limit their motion from the work to a predetermined distance to position them uniformly relatively to parts of the work of different thicknesses, and mechanism constructed and arranged to engage said member at different points in such a manner as to impart movements toward the work of predetermined extent for the fastening-inserting device and of such an extent for the work holding device as to bring it into engagement with the work.

20. A machine of the class described having, in combination, a work-support, a work-engaging device, a member to move the work-engaging device away from and into engagement with work on the support, means differently to limit movements of said device away from parts of the work of different thicknesses to position it a predetermined distance from the work and a variable distance from the work support, and means engaging said member at different points according to the relation of said device to the work support and operative to move said device a predetermined distance toward the work.

21. A machine of the class described having, in combination, a work support, a fastening-inserting driver, a member to move the driver away from and into engagement with work on the support, means differently to limit movements of said driver away from parts of the work of different thicknesses to position it a predetermined distance from the work and a variable distance from the work support, and means engaging said member at different ponits according to the relation of said driver to the work support and operative to move said driver a predetermined distance toward the work.

22. A fastening-inserting machine having, in combination, a work-support, a fastening-inserting driver, a member to move said driver toward and from work on the support, means differently to limit the movements of the driver away from parts of the work of different thicknesses to position the driver a predetermined distance from the work and a variable distance from the work-support, a power-driven shaft, and connections from the shaft including a device to engage said member at different points according to the relative positions of the driver and the work-support and operative to move the driver a predetermined distance toward the work.

23. A fastening-inserting machine comprising, in combination, a work-support, a vertically sliding head, a vertically slidable driver carrier, a driver carried thereby, a yielding connection between the head and the driver carrier, a power-driven shaft, connections from the shaft to the head and the driver carrier varied according to the thickness of work on the support to impart to the driver an operative stroke of predetermined length and with limits predetermined relatively to the surface of work on the support and to impart to the head a work releasing movement, and an adjusting device to vary the length of the operative stroke of the driver.

24. A fastening-inserting machine comprising, in combination, fastening-inserting means, and work-feeding mechanism including a work engaging pawl having a pair of angularly related feed arms each terminating in a plurality of teeth, the pawl being constructed and arranged to be reversed alternatively to position either arm in work engaging position.

25. A fastening-inserting machine comprising, in combination, a driver-carrier, a driver carried thereby, means for moving the driver-carrier to cause the driver to insert fastenings in a work piece presented thereto, and work-feeding mechanism for feeding a work piece to fastening-inserting position including a slide, a feed pawl pivoted thereon and yieldingly urged toward the work, and a member operatively connected to the slide and constructed and arranged to be operated by the driver-carrier to reciprocate the slide and the pawl and thereby to cause the pawl to feed the work.

26. A feeding attachment for a machine of the class described comprising, in combination, a clamp member to engage a part of the machine and form a support, a carrier including feed mechanism mounted on said member to turn between operative and inoperative positions, and means to secure the carrier in operative position, the feed mechanism including a member constructed to extend into position to be engaged by a moving operating part of the machine when the carrier is in operative position and arranged to operate the feed mechanism.

27. A fastening-inserting machine comprising, in combination, a work-support, a rising and falling head including a work-engaging and holding member, and a work-feeding device carried by the head and constructed and arranged to rise and fall with the head in fixed vertical relation to said member.

28. A fastening-inserting machine having, in combination, a work support, a vertically-movable head provided with a nozzle arranged for engagement with work on the support, a driver carried by the head and arranged for movement through the aperture of the nozzle, a hopper carried by the head, a raceway connected to the hopper and arranged to supply fastenings to the nozzle, means for lowering and raising the head once during each cycle of operation of the machine, connections operated by the lowering of the head and arranged to operate the driver to cause the insertion of a fastening, a lever positively rocked by the lowering of the head, and a finger connected to the lever and arranged, as the lever is rocked to feed fastenings along the raceway toward the outlet thereof.

29. A machine of the class described having, in combination, a work supporting horn, a vertically movable throat arranged for engagement with a shoe on the horn to present a fastening thereto, a driver arranged to drive fastenings through the throat into the shoe on the horn, mechanism including a spring for moving the throat from the shoe on the horn a relatively short distance between the insertion of successive fastenings thereby relieving the pressure upon the shoe to facilitate the feeding thereof, a latch arranged normally to prevent movement of the throat beyond said pressure relieving movement, and a controller arranged by its displacement to trip the latch and thereby to permit additional movement of the throat under the action of said spring whereby the throat is raised a greater distance from the horn to facilitate the removal of the shoe from the horn and the placing of another shoe on the horn.

30. A fastening-inserting machine having, in combination, a work support, a vertically movable head provided with a throat arranged to hold the work against the support, a driver arranged to insert a fastening through the throat into the work, mechanism to raise and lower the head, a pawl and ratchet operative to limit the upward movement of the head after the insertion of each fastening thereby relieving the pressure of the throat upon the work, and a controller arranged to disconnect the pawl and ratchet to permit the raising of the head when a work piece is to be removed from or placed upon the support.

31. A fastening-inserting machine having, in combination, a vertically movable head, a driver carried thereby, mechanism arranged to raise and lower the head between the insertion of successive fastenings to facilitate feeding the work, a pawl and ratchet arranged to limit the upward movement of the head, and a controller arranged to disconnect the pawl and ratchet to permit the head to move a substantially greater distance from the work.

In testimony whereof I have signed my name to this specification.

WILLIAM THOMAS BUCKINGHAM ROBERTS.